June 30, 1942.  W. A. JOHNS  2,287,938
GEAR SHIFTING APPARATUS
Filed Aug. 1, 1939  7 Sheets-Sheet 1

Fig. 1.

INVENTOR:
Winthrop A. Johns,
BY Potter, Prince + Scheffler,
ATTORNEYS.

June 30, 1942.  W. A. JOHNS  2,287,938
GEAR SHIFTING APPARATUS
Filed Aug. 1, 1939  7 Sheets-Sheet 3

Inventor:
Winthrop A. Johns,
By Potter, Pierce & Scheffler,
Attorneys.

June 30, 1942.  W. A. JOHNS  2,287,938
GEAR SHIFTING APPARATUS
Filed Aug. 1, 1939  7 Sheets-Sheet 6

INVENTOR:
Winthrop A. Johns,
BY Potter, Pierce & Scheffler
ATTORNEYS

June 30, 1942.  W. A. JOHNS  2,287,938
GEAR SHIFTING APPARATUS
Filed Aug. 1, 1939  7 Sheets-Sheet 7

INVENTOR:
Winthrop A. Johns,
BY Potter, Pierce & Scheffler,
ATTORNEYS.

Patented June 30, 1942

2,287,938

UNITED STATES PATENT OFFICE 2,287,938

GEAR SHIFTING APPARATUS

Winthrop A. Johns, New Brunswick, N. J., assignor to Research Corporation, New York, N. Y., a corporation of New York Application August 1, 1939, Serial No. 287,794

11 Claims. (Cl. 74—336.5)

This invention relates to gear shifting apparatus and particularly to apparatus for use with transmission gears such as are employed for motor vehicles and the like.

This application is a continuation-in-part of my copending application Serial No. 274,634, filed May 19, 1939, "Gear shifting apparatus."

An object of this invention is to provide semi-automatic gear shifting apparatus of relatively simple design and rugged construction for shifting the transmission gears, upon release of the vehicle clutch, in accordance with the position of a member that is controlled by a governor responsive to the vehicle speed. An object is to provide a semi-automatic gear shifting apparatus including a parallel motion linkage that is actuated by a governor responsive to vehicle speed to select the particular gear train that will be engaged when the vehicle clutch is released. An object is to provide a gear shift mechanism including a parallel motion linkage that is warped by a governor responsive to vehicle speed when the latter reaches a value appropriate for a drive through gears other than those then engaged, power mechanism operative to shift the transmission into neutral upon the release of the vehicle clutch, spring mechanism stressed by the warping of the linkage to shift the linkage into another position when it is freed for movement by a shift of the transmission into neutral, and a shift link coupled to the linkage and axially movable thereby to select the transmission gears that will be rendered operative by the power mechanism. A further object of the invention is to provide a semi-automatic gear shift mechanism including a fluid pressure governor responsive to vehicle speed to select the gears that are engaged by a power mechanism. Another object is to provide semi-automatic gear shift mechanism of the type last stated in which the governor includes a relatively stationary member that is manually adjustable to determine the particular gear transmission ratio that will be established when the vehicle speed reaches certain preselected values. Another object is to provide mechanism of the types stated including a cam that is rotatable and axially movable by a power source upon the release of the vehicle clutch, gear shifting mechanism including a shift link operable angularly by the axial movement of the cam, a cam pin movable axially to determine the direction of the axial movement of the cam, and a governor for controlling the axial movement of the cam pin.

These and other objects and advantages of the invention will be apparent from the following specification when taken with the accompanying drawings, in which.

Figure 1:
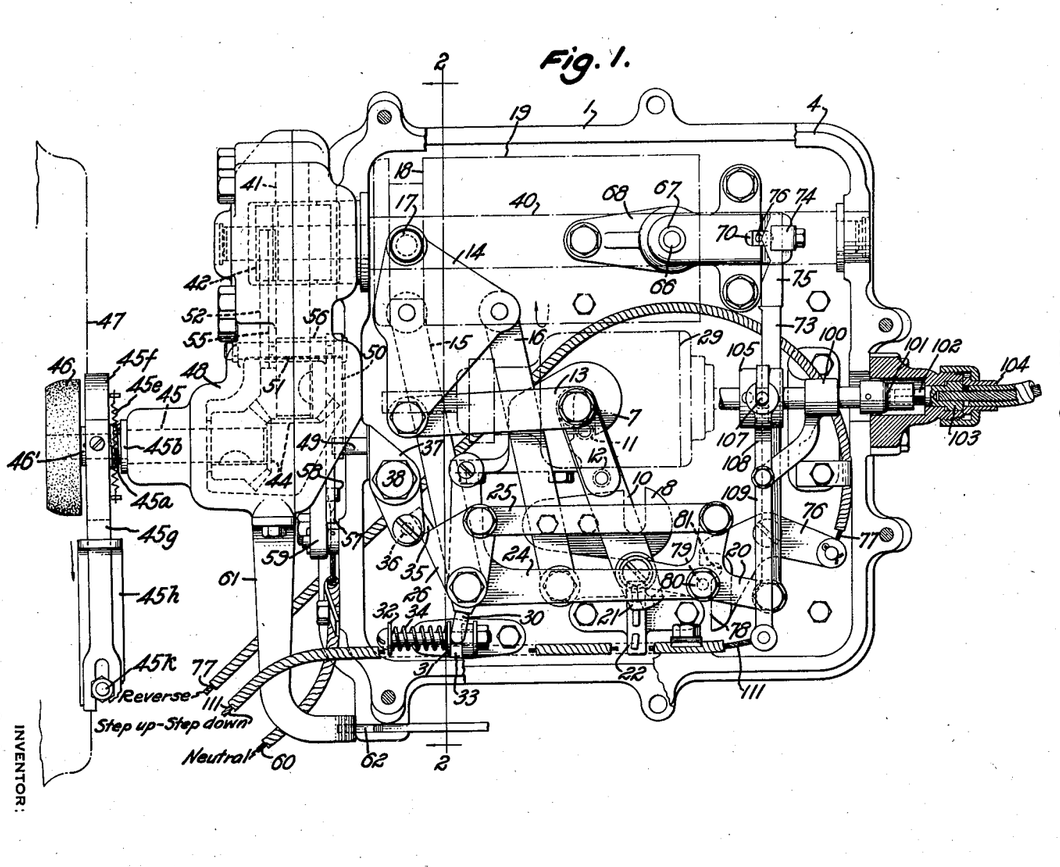
Fig. 1 is a plan view of one embodiment of the invention, the apparatus being shown with the cover removed, and with the governor and cam indicated in broken line.
Figure 2:
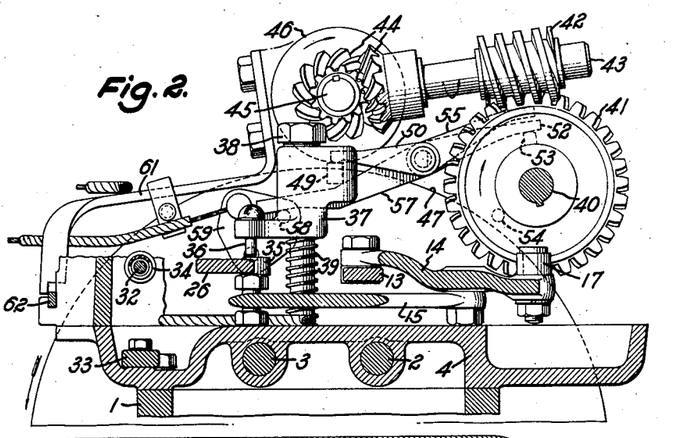
Fig. 2 is a fragmentary transverse section taken substantially on line 2—2 of Fig. 1.
Figures 3, 6:
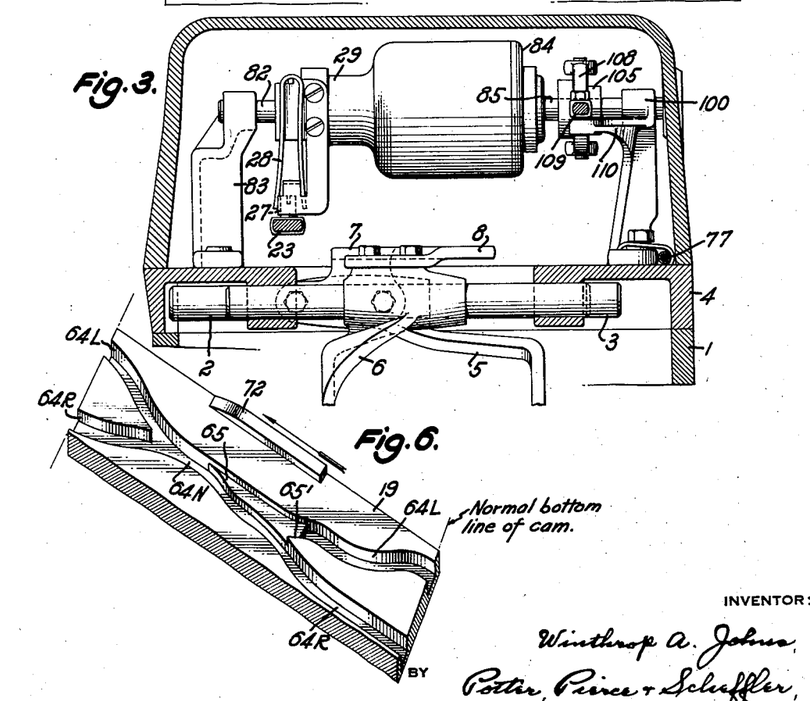
Fig. 3 is a fragmentary longitudinal section, with parts of the linkages omitted for the clearer illustration of the governor and the shifting rods of the transmission gear.
Fig. 6 is a fragmentary perspective view of a development of the cylindrical cam.

In Figs. 1-3 of the drawings, the reference numeral 1 identifies the gear box of a conventional automobile transmission having one "reverse" and three "forward" drive gears, not shown, which are selectively engaged by the axial displacements, from central "neutral" positions, of the rails 2, 3 that are slidable in the cover plate 4 and carry stirrups 5, 6, respectively, to engage the shiftable transmission gear members. Notched plates 7, 8 are secured to the rails 2, 3, respectively, for cooperation with the gear shifting mechanism which, in prior constructions, has been a gear shift lever movable in an H-slot or its equivalent. In accordance with this invention, the gear shift lever is replaced by a motor-driven mechanism that is brought into operation when the clutch is thrown out.

A link 10 has downwardly projecting pins 11, 12 for engagement with the notches in plates 7, 8, respectively, when the link is moved transversely of the gear box, and the upper end of link 10, as seen in Fig. 1 is connected by a link 13 to a triangular plate 14 that is pivoted to the parallel links 15, 16 and carries a roller 17 that travels in a circumferential groove 18 in a cylindrical or barrel cam 19. The lower ends of the parallel links 15, 16 are pivoted on the cover plate 4 and the function of this linkage is to "multiply" the angular displacement of the link for an axial displacement of the cam 19. If the link 10 were extended to and directly connected to the cam 19, the displacement of the pins 11, 12, of link 10 would be about one-half the displacement of the cam 19. The parallel linkage 15, 16 and the triangular plate 14 make the displacement of the pins 11, 12 substantially equal to the axial displacement of the cam. The construction and method of operation of this linkage can be best understood from a consideration of the schematic views, Figs. 4a to 4f, in which the gear shifting linkage is illustrated as vertically displaced from the governor-operated linkage.

The lower end of link 10 is pivoted to one arm of a T-shaped lever 20 and has a notched depending flange 21 for engagement with the rack member 22 that is fixed to the cover plate 4. The stem of the lever 20 forms one side of a parallel motion linkage that includes a bell-crank lever 23, 24 pivoted at its vertex to the plate 4, and a link 25 connecting the lever 20 to a plate 26 that is pivoted on the same axis as the bell-crank lever 23, 24.

Arm 23 carries a stud 27, Fig. 3, that extends between the depending ends of a hairpin leaf spring 28 that is secured to the movable sleeve 29 of a hydraulic speed governor. The plate member 26 has a projecting lug 30 on a bolt 32 that is slidable in a bracket 33 mounted on plate 4 and carries a spring 34 which tends to hold the washers 31 in contact with the bracket 33. Angular movement of plate 26 in either direction compresses the spring 34 and thus establishes a stress tending to return the plate 26 to a normal position with the lug 30 overlying the bracket 33. The plate 26 also has a lug 35 that extends beneath the pin 36 of a latching member which is slidable on a bolt 38 and urged towards elevated position by a spring 39.

The governor 29, parallel motion linkage 20—25, and spring 34 constitute the mechanism for displacing the shifting link 10 transversely of the gear box to engage the pin 11 with the yoke 7 or the pin 12 with the yoke 8. The longitudinal movement of the selected yoke is effected by the cam 19 and the linkage which connects the cam follower 17 to the lever 10. The latching member 37 is a part of a control system for preventing an operation of the cam 19, and thereby a shifting of the gears, so long as the vehicle speed is appropriate for a drive through the gears which are then in mesh.

The cam 19 may be actuated from any power source but preferably is driven from the engine flywheel. The cam shaft 40 to which cam 19 is keyed for axial movement carries a gear 41 that meshes with a worm 42 on a transverse shaft 43 that is connected through bevel gears 44 to the stub shaft 45, the latter carrying a friction roller 46 for engagement with the flywheel 47. The shafts 43 and 45 are mounted in a casing 48 that is not fixed to the gear box but has a limited angular movement about the axis of the cam shaft 40 due to the meshing of the worm 42 with the gear 41. The casing 48 is omitted from Fig. 2 for the better illustration of the cam driving mechanism.

Figures 2A, 2B:
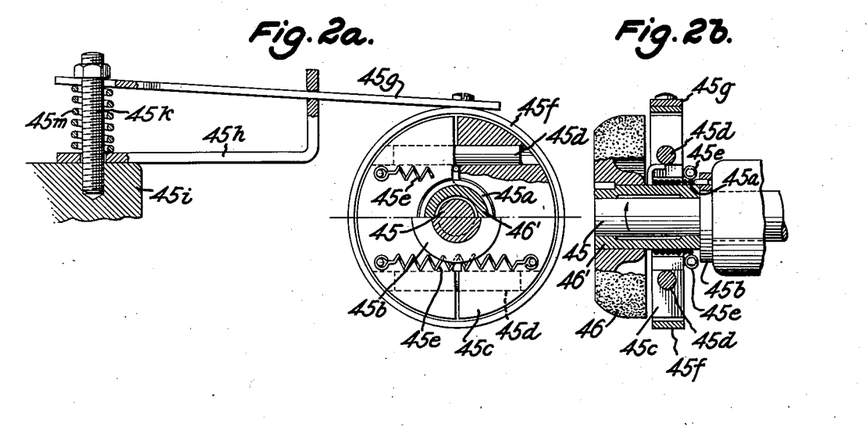
Figs. 2a and 2b are fragmentary transverse and longitudinal sections, respectively, of the automatic clutch in the drive mechanism of the gear-shifting cam.

The friction roller 46 is connected to the shaft 45 through an automatic centrifugal clutch that prevents the speed of shaft 45 from rising above a selected value when the roller 46 is rotated at higher speeds by the flywheel 47. The roller 46 is secured to a sleeve 46' that is rotatable on shaft 45 and normally tightly engaged by the coils of a spring 45a that has one end anchored to a flange 45b of shaft 45 and its other end positioned between two semi-annular centrifugal weights 45c. The weights may slide outwardly from each other on guide pins 45d and are normally held in retracted position by coil springs 45e. A cylindrical brake drum 45f surrounds the weights 45c and is carried by a strap 45g and bracket 45h that are mounted on a fixed part 45i of the engine or gear box. As shown, the strap 45g is adjustable angularly in the bracket 45h, by means of the mounting bolt 45k and spring 45m, to raise and lower the brake drum with respect to the axis of shaft 45.

The brake drum is so positioned that its axis coincides with that of shaft 45 when the roller 46 is in engagement with the flywheel. The roller 46 and its sleeve 46' are positively coupled to the shaft 45, through the spring 45a, so long as the rotary speed of shaft 45 is below that value at which the weights 45c engage the brake drum. The spring 45a is wound in such sense that it is uncoiled from engagement with sleeve 46' when its right end, at shaft flange 45b, is rotated at higher speed than its left end. The clutch engagement is therefore broken when the shaft 45 rotates above a certain speed, and the roller and sleeve rotate idly on shaft 45 until the speed of the latter drops and the weight 45c are withdrawn from the brake drum. The brake drum 45f also serves to arrest the rotation of shaft 45 when the roller 46 is lifted from engagement with the flywheel. The weights 45c will be brought against the upper part of the brake drum and the latter may be raised, against the force exerted by spring 45m, if the weights are in expanded position and closely adjacent the brake drum when the roller 46 is lifted.

The roller 46 is normally spaced from the flywheel and the weight of the casing 48 and the enclosed gears tends to rotate the casing counter-clockwise, as seen in Fig. 2, for engagement of the friction roller with the flywheel when certain latching devices are released. The latching member 37 that is controlled by the vehicle speed has a forwardly projecting pin 49 that constitutes a stop or support for the casing 48 when the member 37 is held in elevated position by lug 35 of the plate 26. The lever arm 50 is secured to a shaft 51 that is mounted in the casing 48, and the end of the arm 50 rests on the pin 49. The lever arm 52 on the other end of the shaft 51 is positioned in the path of a pin 53 on the hub of the gear 41. The lever system is so designed that its axis, i. e. the shaft 51 is lifted when the lever 50 is supported in raised position by the pin 49 of latching member 37 and the end of lever 52 is lifted by the pin 53. The pin 53 therefore serves to rock the gear casing 48 to break the driving engagement of friction roller 46 with the flywheel. The angular position of pin 53 is such that it stops the cam 19 when the latter is in an end position corresponding to the completion of a shift to engage one of the gear combinations.

A manually controlled latch is provided for arresting the cam motion when the shifting link 10 is in neutral position. This mechanism comprises a pin 54 on gear 41, a lever arm 55 on the tubular shaft 56 that surrounds the shaft 51, and a lever arm 57 on the shaft 56. The lever arm 55 lies in the plane of, but is normally above, the path of the pin 54. The tail of the lever arm 57 rests upon a pin 58 on a plate 59 that may be rocked counterclockwise by a pull cable 60 that extends to the steering column or instrument panel of the vehicle. A manual setting of the pull cable 60 for "neutral" rocks the plate 59 to lift lever arm 57, thus depressing lever arm 55 into the path of the pin 54.

Figure 7:
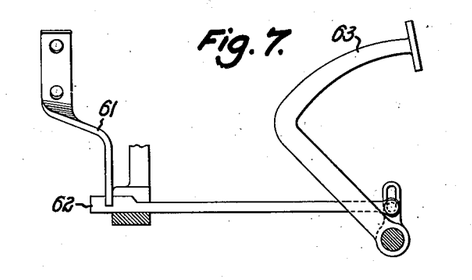
Fig. 7 is a fragmentary side elevation of the clutch operated latching member.
Figure 8:
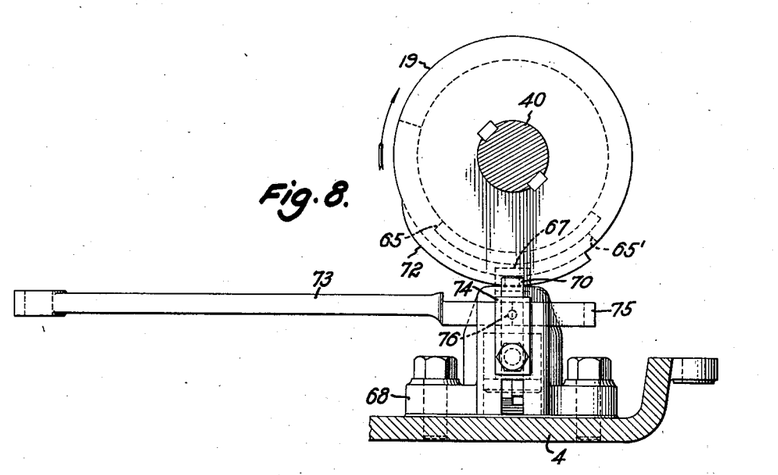
Fig. 8 is a fragmentary end elevation of the cam, the cam follower and its adjusting plate.
Figure 9:
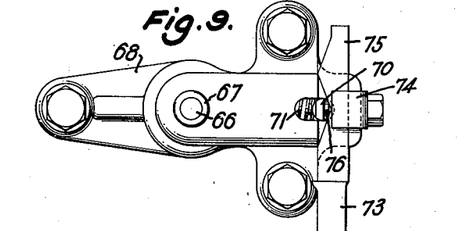
Fig. 9 is a plan view of the cam follower and its housing.
Figure 10:
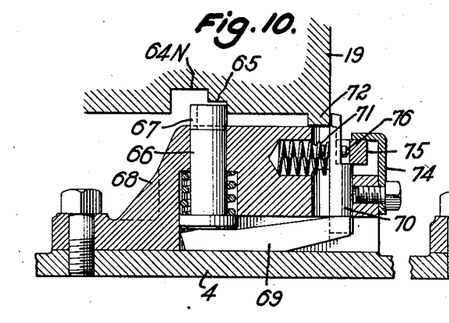
Figs. 10 and 11 are fragmentary sectional views of the cam follower and cam.
Figure 11:
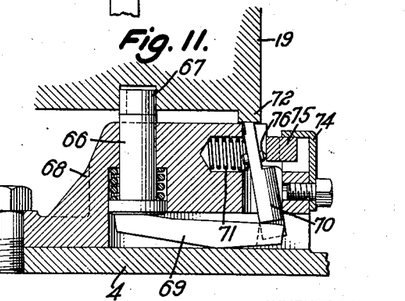

A third control of the cam driving mechanism is associated with the vehicle clutch, not shown, to prevent operation of the gear shifting mechanism so long as the clutch is engaged. This control or latching mechanism comprises a strap 61 secured to the casing 48 and resting upon a cam slide 62 that is moved to the left, as seen in Figs. 1 and 7, when the clutch pedal 63 is depressed to release the clutch. This motion of the slide 62 moves the wide section thereof from beneath the strap 61 and allows the strap to drop.

Reverting to the cam 19, this member has two circumferential cam grooves 64R, 64L that merge in a groove section 64N. The cam 19 comes to rest under normal operating conditions in one of its end positions and after one complete revolution. The normal bottom line of cam 19 is indicated by a broken line in Fig. 6, and is identified by a descriptive legend. The cam 19 is stopped in this normal position by the pin 53 as it moves beneath the end of the lever 52 to lift the gear casing 48. Cam 19 may be stopped after a rotation of about 120°, with the cam groove 64N at the bottom of the cam, by manually operating cable 60 to tilt the plate 59 and thus position the lever 55 for engagement by pin 54 to lift the gear casing 48.

The groove 64L, or at least the entrance section 65 thereof, is of greater diameter than the groove 64R and the direction in which the cam moves axially is determined by the extent to which a relatively stationary pin 66 and its roller 67, Figs. 8 to 11, project into the cam groove section 64N. The splitter edge 65' at the branching grooves 64R, 64L shifts the cam 19 to the left to bring groove 64L into operation when pin 66 is in lowered position, and the side edge of cam section 65 brings the groove 64R into operation when the pin 66 is in raised position. These operations may be visualized as a deflection of the pin 66 into the larger and smaller diameter grooves but the pin 66 is in fixed lateral position and it is the cam that is shifted axially by the splitter edge 65' and the side edge of section 65.

Pin 66 is vertically movable in a housing 68 that is fixed to the cover plate 4 below the axis of the cam 19. The pin 66 rests upon one end of a rocking lever 69 that is notched at its opposite end to receive the flatted or half-round end of a cylindrical member 70 that is pressed away from the pin 66 by a spring 71. The upper end of the member 70 is notched to clear or alternatively to be engaged by the section 72 of cam 19 that projects circumferentially over a limited region in axial alinement with and extending somewhat beyond the cam groove section 64N.

The member 70 is rocked angularly by the movement of the rod 73 that is slidably supported on the housing 68 by a cap strip 74 and terminates in a notched end section or plate 75 against which the pin 70' of the member 70 bears. The rod 73 is pivotally connected to the outer end of the T-lever 20 of the parallel motion linkage, and the notched plate 75 has two crests and two valleys for engagement with the pin 70' of member 70 to position the latter to be engaged by or alternatively to be cleared by the projecting section 72 of the cam 19. Member 70 is tilted to the left when a crest of the notched plate engages the pin 70', Figs. 1, 4b and 11, and the pin 66 is therefore raised when member 70 is depressed by the initial rotary movement of the cam 19. This conditions the cam 19 for a shift to the right for an engagement of the second speed or the reverse gears. Conversely, when pin 70' of member 70 engages a valley of the plate 75, the member 70 is not depressed by the cam 19, 72 and the pin 66 therefore remains in lowered position. This conditions the system for movement of the cam 19 and shift link 10 to the left for engagement of the low or the high speed gears.

Manually operated means must be provided for a power-operated shift to reverse gear, and this mechanism preferably is designed to prevent the setting of the system for a shift to reverse gear when another gear drive is operative and the vehicle is operating at a speed above that appropriate for a shift to second gear. The reverse setting mechanism comprises a bell-crank lever or plate 76 that is pivoted on the cover plate 4 and normally stands in the position shown in Fig. 1. One arm of the lever has a flexible cable 77 connected thereto for rocking the lever clockwise when reverse drive is desired. The other end of the cable extends to the steering post or instrument panel, not shown, of the vehicle. The other arm of lever 76 has a transversely disposed edge 78 closely adjacent the path of movement of a pin 79 that depends below the bolt 80 that forms the pivotal connection of members 20, 24 of the parallel motion linkage. Engagement of the surface 78 with the pin 79 prevents a clockwise motion of the lever 76 when pin 79 is in the position shown in Fig. 1 (corresponding to a drive in low gear at a speed appropriate for a shift into second gear) or in a lower position. The pin 79 is at a higher level, as viewed in Fig. 1, when the low gear is engaged and the vehicle at rest or moving slowly, as will be explained hereinafter, and a notch 81 at the upper end of surface 78 alines with this position of the pin 79. This position of the parts permits a manual adjustment of lever 76 in clockwise direction, by the flexible cable 77, to engage the notch 81 with the pin 79 to move the pin transversely of the gear box (upwardly as seen in Fig. 1). This motion of the pin 79 conditions the parallel motion linkage for a shift of the "low-reverse" rail 2 to the right, Fig. 1, to engage the reverse drive gears.

Figure 12:
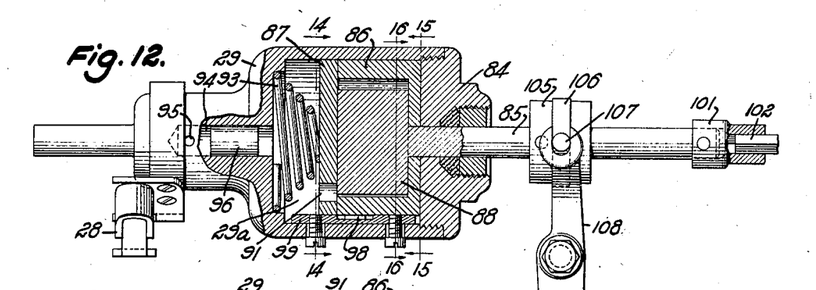
Figs. 12 and 13 are fragmentary plan and side elevations of the hydraulic governor, with parts shown in section.
Figure 13:
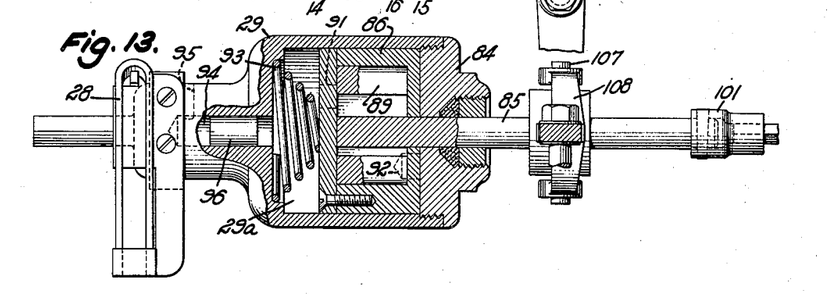
Figures 14, 15, 16, 17:
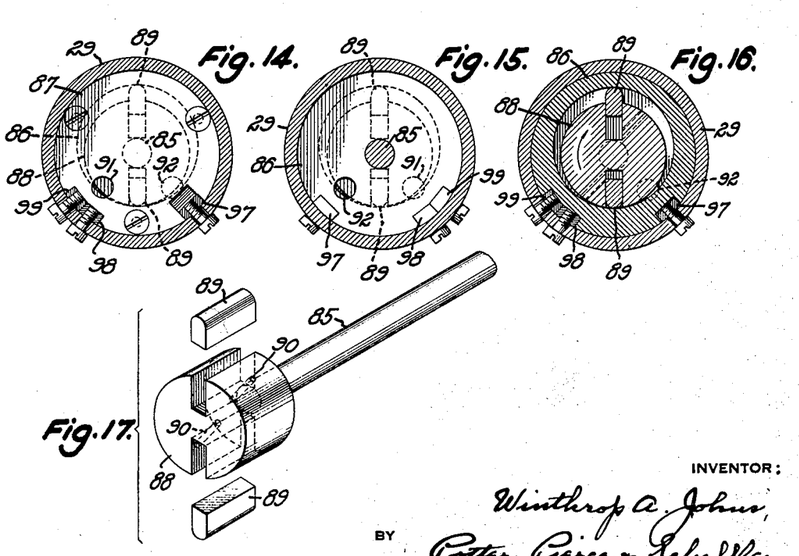
Figs. 14, 15 and 16 are transverse sections through the governor on lines 14—14, 15—15 and 16—16, respectively of Fig. 12.
Fig. 17 is an exposed perspective view of the pump mechanism of the governor.

The governor mechanism that is actuated from the propeller shaft or rear axle, not shown, is preferably of a hydraulic type that can develop large forces with apparatus of small size. The governor casing 29 has a stem 82 which slidably supports the casing on a bracket 83 that is mounted on the gear case cover 4, Fig. 3, and an end cover 84 in which the rotatable governor shaft 85 is slidably supported. The shaft 85 is also rotatable in a pump casing 86, Fig. 12, that is closed by a cover plate 87 and, with the latter, forms a piston that is slidable in the governor casing 29. The shaft 85 terminates in a rotor head 88 that has diametrically opposed slots for receiving the blades 89 that are forced outwardly into engagement with the wall of the eccentric bore of the pump casing 86 by pressure fluid entering through passages 90 that extend from the base of the slots to the periphery of the rotor. An inlet port 91 is provided in the pump cover 87 and an outlet port 92 in the pump casing 86. These ports are so arranged that the pump tends to move liquid, preferably a light oil, from the left to the right end of the casing 29. A spring 93 tends to move the governor casing 29 towards the left, Figs. 12 and 13, thus confining the oil to the space 29a within casing 29 at the left of the pump casing 86. Casing 29 has a counterbore 94 that has a vent opening 95 to atmosphere and slidably receives a breather plug 96. Temperature changes that vary the volume of the oil within casing 29 are relieved by the sliding of the plug 96 within the bore 94 and the pressure at the inlet side of the pump is substantially atmospheric. A plurality of ported strips or keys 97, 98, 99 are secured to and project inwardly from the governor casing 29 and fit snugly within grooves in the exterior of the pump casing 86 and its cover 87.

Figure 18:
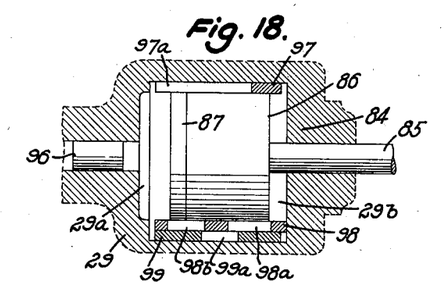
Fig. 18 is a schematic view of the ports which connect the opposite sides of the governor casing.

As shown in the schematic view, Fig. 18, the key 97 has a short solid section at its right end and a reduced section that provides a shallow port 97a for the return of oil from the space 29b at the right of the piston to the space 29a at the left end of the casing 29. Key 98 has two axially spaced ports 98a, 98b, and key 99 has a centrally located port 99a. One or both of the keys 98, 99 are preferably adjustable on the casing 29 to vary the relationship between vehicle speed and governor displacement.

Figure 19:
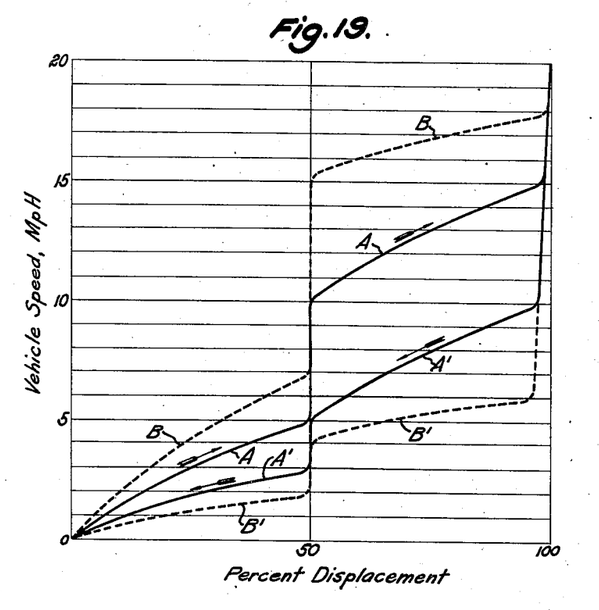
Fig. 19 is a curve sheet showing the relationship of vehicle speed to governor casing displacement.

The ports of the keys are so positioned that the hydraulic pressure, and therefore the axial displacement of the governor casing 29, increases rapidly over certain ranges of governor speed and increases but slowly over other governor speed ranges. For normal operation, an appropriate relationship between vehicle speed and governor displacement under no load during acceleration may be substantially as shown by the solid line curve A of Fig. 19 and, during a slowing down of the vehicle, as indicated by the solid line curve A'. The dotted line curves B, B' respectively indicate the corresponding characteristics in actual operation when the governor displacement is opposed by the spring 34 of the parallel motion linkage. Curve A indicates that the governor displacement rises rapidly to about 50% its total value as the vehicle accelerates to about 5 miles per hour, increases slowly as the vehicle speed rises to about 10 miles per hour, then rises rapidly to approximately full displacement at a vehicle speed of about 15 miles per hour, and then increases slowly as the vehicle is accelerated to top speed. On slowing down, the no-load governor characteristic as shown by curve A' may be such that corresponding critical vehicle speeds are, in reverse order, about 10, 5 and 3 miles per hour. Since the stress of the spring 34 must be overcome by the governor, the critical speeds on acceleration may be about 7, 15 and 18 miles per hour, and, on slowing down, about 6, 4 and 2 miles per hour.

A governor characteristic of this type is obtained by so locating the right end of the port 98a of key 98 that it is cleared by the pump casing 86 when the governor casing reaches about 50% displacement. This condition opens a bypass or relief passage around the pump casing 86, through port 98a of key 98, port 99a of key 99 and port 98b of key 98. Increasing governor speed effects the transfer of a larger volume of fluid from the casing chamber 29a to the right of the pump casing 86, but the hydraulic pressure at the right of the casing increases but slowly with the governor speed until the displacement of the governor casing 29 to the right diminishes the effective capacity of the by-pass ports as the outlet port 98b is throttled by the pump casing 86. The governor casing 29 then moves rapidly to the right with increasing governor speed until the right end of the pump casing opens the port 97a of the key 97. This port is of such size that it by-passes the maximum capacity of the pump, thus preventing a substantial rise in the effective hydraulic pressure as the vehicle speed is increased to its top value.

The governor shaft 85 is rotatably and slidably supported in a bearing bracket 100 and is driven through the coupling sleeve 101 that telescopes over the squared end 102 of the driving head 103 on the end of flexible shaft 104. Collar 105 is pinned to the shaft 85 and rotates within a ring 106 that has vertically extending lugs 107 engaged by the yoked end 108 of lever 109 that is pivoted on the bracket arm 110.

Flexible cable 111 extends from the end of lever 109 to the vehicle panel for a manual control of the gears that will be engaged at a given vehicle speed. The normal position of lever 109, as shown in Fig. 1, conditions the governor for a shift into second gear at a vehicle speed of about 5 miles per hour and a shift to high gear at about 15 miles per hour. Adjustment of lever 109 displaces the entire governor assembly axially and thereby provides a "step up-step down" control by alternating the critical vehicle speeds at which the governor rocks the parallel motion linkage 20, 23—26 to release the latch member 37 for a shifting of the gears.

The method of operation of the described apparatus may be best understood by first considering the function of certain parts of the system. The shifting of the gears is effected by the axial movement of cam 19 through the roller 17 and linkage 13—16 that displaces the upper end of the shifting link 10. The driven connection to the cam shaft 40 is controlled by both the clutch and the vehicle speed governor through the latch systems comprising strap 61 and the cam slide 62, and the latching member 37 and lug 35 of plate 26, respectively. Cam 19 is rotated only when, upon release of the clutch, the vehicle speed is appropriate for a drive through gears other than then engaged. The direction of axial movement of cam 19 is determined by the raised or lowered position of the cam pin 66, and this position is controlled by notched plate 75 that is adjusted by the T-lever 20 of the parallel motion linkage in accordance with the vehicle speed. The position into which the bell-crank lever 23, 24 is shifted by the vehicle speed governor determines the direction of lateral displacement of the shifting link 10, and thereby selects the "low-reverse" rail 2 or the "second-high" rail 3 for operation. It may here be noted that a progressive shifting through the several forward speed gears is not compulsory as the shift may be directly from low to high, or from high to low, when the clutch is released while driving in one of these gears at a speed appropriate for a drive at the other gear ratio.

The method of operation will be described in connection with Figs. 4a to 4f which, except for the illustration of springs 34a, 34b in place of the single spring 34 of Fig. 1, conform to the actual apparatus as modified to separate the cam-operated linkage system 13—16 from the parallel motion linkage 20, 23—26 that is controlled by the vehicle speed governor.

Figure 4A:
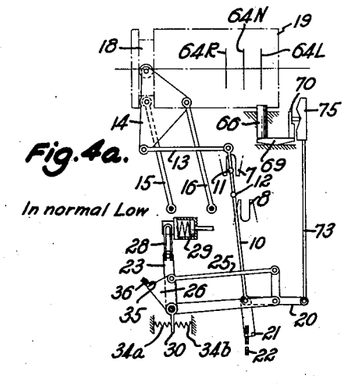
Figs. 4a to 4f are schematic views showing different adjustments of the linkage systems.
Figure 4B:
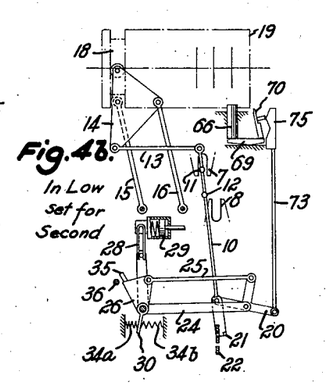
Figure 4C:
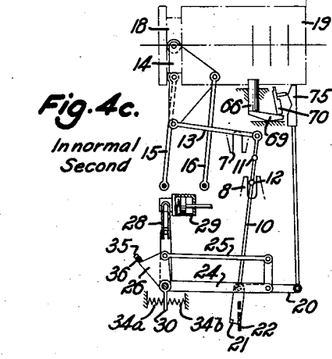
Figure 5:
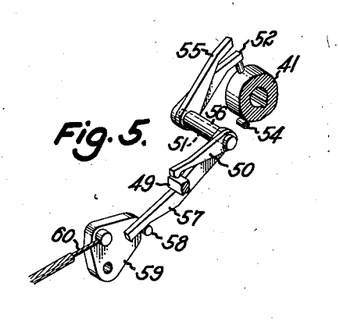
Fig. 5 is a perspective view of the devices for arresting the drive of the cam that shifts the gears.

Assuming that the vehicle was stopped in the normal manner with the clutch disengaged, the several parts stand as shown in Fig. 4a. The drive is through the low speed gears when the engine is started and the clutch is engaged. The casing 29 of the vehicle speed governor moves to the right as the vehicle speed increases, thus rocking the lever 23, 24, clockwise, and thereby rocking the T-lever clockwise through a greater angle since the left end of the lever 20 is fixed by its pivotal connection to the link 10, the latter being locked by the location of its flange 21 in the upper notch of the rack 22, see Figs. 1 and 4b. Plate 26 is constrained by link 25 to move through the same angle as T-lever 20, and thereby compresses spring 34a and moves the lug 35 from vertical alinement with the pin 36 of the latch member 37. The spring 39, Fig. 2, is relatively weak and the latching member is no longer operative to hold the driving gear casing 48 in elevated position. Casing 48 is now held in raised position to prevent the engagement of the friction roller 46 with the flywheel 47 only by the strap 61 and cam slide 62 that is actuated by the clutch pedal control. The release of the clutch renders this second latch inoperative and the cam shaft 40 is then driven by the roller 46 and the associated gearing. The initial rotation of the cam 19 shifts it to the right to bring the cam groove 64N in engagement with the roller 67 on pin 66. Link 10 is thus shifted into neutral position with its flange 21 freed from the rack 22. This initial rotation of shaft 19 carries the stop pin 53, Fig. 5, past the end of the lever 52 which is thus freed to permit the linkage 50—52 to rock back to normal position which it does as the stress in spring 39 lifts the member 37. The stress in spring 34a rocks the plate 26 counterclockwise to return its lug 35 into position beneath the pin 36 of the latch member 37 and, through the link 25, rocks the T-lever 20 in the same direction to move the link 10 downwardly to position its flange 21 in line with the lower notch of the rack 22. Shift pin 12 of the link 10 is now engaged in the notch of the yoke 8 that is connected to the "second-high" shifting rail 3. Further rotation of the cam 19 brings its flange 72 into contact with the member 70, thereby depressing the same and lifting the pin 66. This position of pin 66 brings the cam groove 64R into operation and the cam 19 therefore moves to the right as its rotation is continued. The link 10 is therefore rocked to the right and the yoke 8 and rail 3 are shifted to the right to engage the second speed gears. Rotation of the cam 19 is arrested upon the completion of one revolution when the pin 53 rides beneath and lifts the lever 52 since, as stated above, the lug 35 is again positioned beneath the pin 36. The parts now stand in the positions shown in Fig. 4c. The vehicle drive is through the engaged second speed gears when the clutch is again engaged.

Figure 4D:
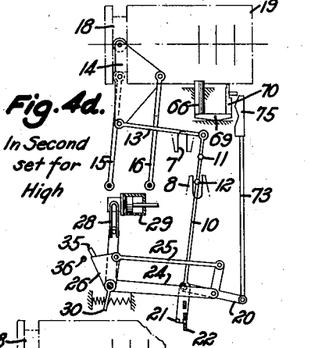
Figure 4E:
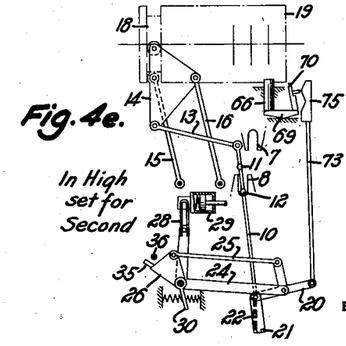
Figure 4F:
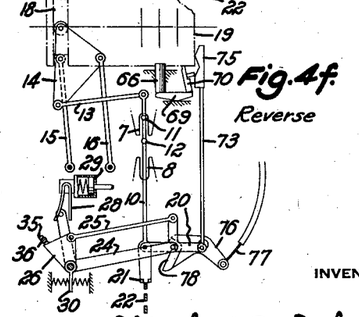

A further increase in vehicle speed produces a further clockwise motion of the bell-crank lever 23, 24, Fig. 4d. This rocks the T-lever 20 to shift rod 73 downward to position a valley of the plate 75 in line with pin 76 of member 70. This conditions the cam 19 for a shift to the left as the pin 66 will remain in lowered position when the cam flange 72 clears the member 70. The movement of lever 20 produces a clockwise motion of plate 26 that moves lug 35 from beneath the pin 36 of the latch member 37, thus rendering the latter inoperative. Release of the clutch displaces the cam slide 62 and the roller 46 drops into engagement with the flywheel 47. When shift link 10 reaches neutral position upon the initial rotation of the cam 19, the stress in the spring 34a is released by rocking the plate 26 counterclockwise to restore the lug 35 to its normal position beneath pin 36 of latch member 37. This movement of the parallel motion linkage also drops the shift link 10 downward to position its flange 21 below the lower projection of the rack 22. The continued rotation of cam 19 rocks the shift link 10 to the left to bring the high speed gears into operation.

The shift down to lower gears takes place in a similar manner. Lever 23, 24 is rocked counterclockwise by the governor sleeve 29 when the speed falls below that appropriate for high gear drive, Fig. 4e, and through the tilting of the T-lever 20 stresses the spring 34b and raises the rod 73 to position a crest of plate 75 in engagement with the pin 76 of member 70. Upon releasing the clutch the cam drive is brought into operation and the link 10 is shifted into neutral position and the stress in spring 34b is relieved by rocking the plate 26 clockwise and lifting the shift link 10 to place its pin 12 in the outer part of the notch in the notch in the yoke 8. Further rotation of the cam 19 shifts the link 10 and yoke 8 to the right to engage the second speed gears.

The step-down from second to low takes place in a similar manner when the governor casing 29 moves to the left to stress the spring 34b through the warping of the parallel motion linkage.

Reverse gear drive is obtained manually by pulling cable 77 to rock lever 76 clockwise to lift the T-lever 20 and position the flange 21 of link 10 above the upper projection of the rack 22, and to position a crest of the plate 75 opposite the member 70. This sets the cam 19 for a movement to the right, and the shift therefore is into reverse gear when the clutch is released and the cam 19 is rotated.

The operation of the power mechanism may be arrested to leave all gears disengaged, i. e. in neutral position, by manual adjustment of the pull cable 60 to rock the plate 59 and thereby depress the lever arm 55 into the path of the pin 54.

The adjustment of the lever 109 by the cable 111 enables the operator to select either a higher or a lower gear ratio than is "standard" for driving the vehicle at a particular speed. A "step-up" adjustment for starting in second gear is obtained by pulling on cable 111 to rock the lever 109 clockwise, thus shifting the governor assembly to the right of its normal rest position, i. e. into the position shown in Fig. 1. Similarly, a "step down" control for shifting back to second when the vehicle is operating on high gear is obtained by adjusting the lever 109 in the opposite direction to move the governor pump and piston assembly to the left. The governor casing also moves to the left as its position with respect to the piston is determined by the governor speed. This movement of the governor casing rocks the lever 23, 24 counterclockwise, as in Fig. 4e, to condition the system for a shift into second gear. The manually produced displacements of the relatively fixed elements of the governor are preferably equal to about 50% of the total governor displacement, whereby the operator's choice of standard, step-up or step-down operation does not alter the critical vehicle speeds at which a gear shifting operation may be effected but does determine the particular transmission gears that may be engaged at the critical vehicle speeds.

It is to be understood that the invention is not restricted to the particular embodiments herein shown and described and that changes may be made in the constructions and locations of the several parts without departing from the spirit of the invention as set forth in the following claims.

I claim:

1. A gear shifting apparatus for use with a change speed gear of the type including a pair of slide rails operable in opposite directions from neutral positions to control the speed ratio between a driving and a driven shaft, said apparatus comprising a shift link extending transversely of said rails, coupling means projecting from the shift link for engagement with one or the other of said slide rails, means supporting said shift link, for axial movement to engage said coupling means with one or the other of said slide rails, said supporting means comprising a four bar parallel motion linkage having a single fixed pivot point, one end of said shift link being pivotally connected to a bar of said linkage at a point remote from said fixed pivot point, and means coupled to the other end of said shift link for moving said shift link angularly, thereby to move the slide rail that is engaged by said coupling means.

2. A gear shifting apparatus as claimed in claim 1, in combination with means locking said shift link against axial movement when displaced angularly from its neutral position, means including a governor responsive to driven shaft speed for moving said linkage about said fixed pivot to condition said shift link for an axial movement, and spring means for moving said shift link axially upon the return thereof to its neutral position after movement of said linkage by said governor.

3. In a semi-automatic gear shift mechanism for selectively actuating a pair of slide rails in opposite directions to determine the speed-ratio between a driving and a driven shaft, a shift link extending transversely of said rails, means supporting said link for axial movement to couple the shift link to one or the other of said slide rails, power mechanism for imparting angular movement to said link in opposite directions from a neutral position, means comprising a governor responsive to the speed of said driven shaft for shifting said link axially, and means controlled by said governor for determining the direction of angular movement to be imparted to said link by said power mechanism, said supporting means including a parallel motion linkage having one fixed and a plurality of floating pivot points, said shift link being pivoted to a member of said linkage at a point remote from said pivot points.

4. In a semi-automatic gear shift mechanism for selectively actuating a pair of slide rails in opposite directions to determine the speed-ratio between a driving and a driven shaft, a shift link extending transversely of said rails, means supporting said link for axial movement to couple the shift link to one or the other of said slide rails, power mechanism for imparting angular movement to said link in opposite directions from a neutral position, means comprising a governor responsive to the speed of said driven shaft for shifting said link axially, and means controlled by said governor for determining the direction of angular movement to be imparted to said link by said power mechanism, said means for shifting said link axially including a parallel motion linkage having one fixed and three floating pivot points, and a yielding coupling between said governor and a linkage member that is pivoted at the fixed pivot point.

5. A gear shifting apparatus for use with a change speed gear of the type including a pair of slide rails selectively operable in opposite directions from neutral positions to control the speed ratio between a driving shaft and a driven shaft, said apparatus including a shift link extending transversely of said rails and means mounting the same for axial movement selectively to engage one or the other of said slide rails, power mechanism including an axially movable cam for imparting angular movement to said shift link in opposite directions, means including a governor responsive to the speed of the driven shaft for determining the direction of axial movement of said cam, and means for energizing said power mechanism.

6. A gear shifting apparatus as claimed in claim 5, wherein said power mechanism includes a four bar parallel motion linkage having two fixed pivot points, the bar opposite said pivot points being a plate coupled to said cam for movement thereby, and a link member coupling said shift link to said plate.

7. In gear shifting apparatus, the invention as claimed in claim 5, wherein said power mechanism includes a multiple bar linkage, and means for energizing said power mechanism includes two latch means normally preventing energization of said power mechanism, one latch means being carried by said multiple bar linkage and actuated to inoperative position upon the warping of said linkage, and the second latch means being actuated to inoperative position upon the interruption of a power supply to said driving shaft.

8. In a gear shift mechanism, the combination with a shift link movable angularly in opposite directions, means including a cylindrical cam splined to and axially movable on a shaft for actuating said shift link, said cam having diverging surfaces of different diameters to determine the direction of axial movement of said cam, a follower pin for cooperation with said cam surfaces, means restricting movement of said follower pin to axial displacements, a rocker bar having said pin supported on one end thereof for axial movement to engage one or the other of said cam surfaces, and means for rocking said rocking bar to position said pin for engagement with one or alternatively the other of said cam surfaces.

9. In a gear shift mechanism, the invention as claimed in claim 8, wherein said rocking means includes said cylindrical cam.

10. In a gear shift mechanism, the invention as claimed in claim 8, wherein said rocking means includes said cylindrical cam, and means locking said rocking bar in the position to which it is moved by said rocking means as said diverging cam surfaces approach said pin.

11. In a power-operated gear shift mechanism for an engine propelled vehicle, the combination with adjustable change speed gears, shifting mechainsm adjustable to a plurality of positions to provide different transmission ratios through said change speed gears, a cam for actuating said shifting mechanism, and means adjustable to determine that position into which said shifting mechanism will be actuated by said cam, of means for rotating said cam from the flywheel of the vehicle engine; said cam rotating means comprising a cam shaft, a stub shaft, gearing connecting said shafts, a roller carried by and rotatable on said stub shaft, a clutch normally coupling said roller to said stub shaft, means responsive to the speed of the stub shaft for disengaging said clutch when the speed of the stub shaft rises above a selected value, and means supporting said stub shaft for movement to carry said roller into and out of engagement with the flywheel.

WINTHROP A. JOHNS.